United States Patent
Oh et al.

(10) Patent No.: US 10,470,104 B2
(45) Date of Patent: Nov. 5, 2019

(54) METHOD AND APPARATUS FOR BROADCAST GEO-LOCATION DATABASE (GLDB) FOR TELEVISION WHITE SPACE (TVWS) SPECTRUM ACCESS

(71) Applicant: AGENCY FOR SCIENCE, TECHNOLOGY AND RESEARCH, Singapore (SG)

(72) Inventors: Ser Wah Oh, Singapore (SG); Yugang Ma, Singapore (SG); Chu Yeow Edward Peh, Singapore (SG); Yiyang Pei, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 51 days.

(21) Appl. No.: 15/568,457

(22) PCT Filed: Apr. 20, 2016

(86) PCT No.: PCT/SG2016/050184
§ 371 (c)(1),
(2) Date: Oct. 20, 2017

(87) PCT Pub. No.: WO2016/171621
PCT Pub. Date: Oct. 27, 2016

(65) Prior Publication Data
US 2018/0124686 A1     May 3, 2018

(30) Foreign Application Priority Data
Apr. 20, 2015 (SG) .......................... 10201503084S

(51) Int. Cl.
*H04W 48/10* (2009.01)
*H04H 60/50* (2008.01)
(Continued)

(52) U.S. Cl.
CPC ............ *H04W 48/10* (2013.01); *H04H 60/23* (2013.01); *H04H 60/43* (2013.01); *H04H 60/50* (2013.01);
(Continued)

(58) Field of Classification Search
CPC ..................................................... H04W 48/10
(Continued)

(56) References Cited

U.S. PATENT DOCUMENTS

2010/0074345 A1    3/2010    Nguyen et al.
2012/0182180 A1*   7/2012    Wolf ....................... G01S 5/021
                                                                        342/357.29
(Continued)

FOREIGN PATENT DOCUMENTS

EP       2 555 549 A2      2/2013
GB      2 477 916 A       8/2011
(Continued)

OTHER PUBLICATIONS

Keith Jack, Digital Video and DSP (Year: 2008).*
(Continued)

*Primary Examiner* — Peter G Solinsky
(74) *Attorney, Agent, or Firm* — Womble Bond Dickinson (US) LLP

(57) ABSTRACT

Embodiments of the invention relate to method of operating television white space (TVWS) geo-location database (GLDB). The method comprises: embedding a plurality of data signals in a plurality of radio frequency (RF) broadcast signals of at least one existing television or radio channel, wherein the data signals comprise at least one of TVWS GLDB data, time reference data and broadcast transmitter data which comprises at least one of transmitter location data and transmitter identification; and transmitting, over a RF network which is other than an internet protocol (IP)

(Continued)

network, the RF broadcast signals together with the embedded data signals to a plurality of white space devices.

18 Claims, 8 Drawing Sheets

(51) Int. Cl.
*H04W 16/14* (2009.01)
*H04H 60/23* (2008.01)
*H04H 60/43* (2008.01)
*H04L 5/00* (2006.01)
*H04N 21/61* (2011.01)
*G06F 16/29* (2019.01)

(52) U.S. Cl.
CPC ............ *H04L 5/00* (2013.01); *H04N 21/6112* (2013.01); *H04W 16/14* (2013.01); *G06F 16/29* (2019.01)

(58) Field of Classification Search
USPC ........................................... 370/310
See application file for complete search history.

(56) References Cited

U.S. PATENT DOCUMENTS

| | | | |
|---|---|---|---|
| 2014/0204891 A1* | 7/2014 | Park | H04W 56/00 370/329 |
| 2015/0358963 A1* | 12/2015 | Sawai | H04W 4/70 370/336 |
| 2016/0094895 A1* | 3/2016 | Stadelmeier | H04H 20/59 725/33 |
| 2016/0128000 A1* | 5/2016 | Furuichi | H04W 52/143 370/329 |
| 2016/0156393 A1* | 6/2016 | Chen | H04B 7/0413 370/329 |
| 2016/0259062 A1* | 9/2016 | Raghupathy | G01S 19/48 |
| 2017/0280329 A1* | 9/2017 | Sun | H04W 16/14 |
| 2018/0092103 A1* | 3/2018 | Gurney | H04W 8/24 |

FOREIGN PATENT DOCUMENTS

WO    WO 95/23981 A1    9/1995
WO    WO 2015/026388 A1    2/2015

OTHER PUBLICATIONS

PCT International Search Report for PCT Counterpart Application No. PCT/SG2016/050184, 4 pgs. (dated Jun. 13, 2016).
PCT Written Opinion for PCT Counterpart Application No. PCT/SG2016/050184, 4 pgs. (dated Jun. 13, 2016).
FCC 06-156, First Report and Order and Further Notice of Proposed Rule Making, 43 pgs. (Oct. 18, 2006).

* cited by examiner

| Transmitter data (location data and/or identification data) | TVWS GLDB data | Time reference data |
|---|---|---|
| PN codes corresponding to transmitters |||
| Encryption |||
Figure 2
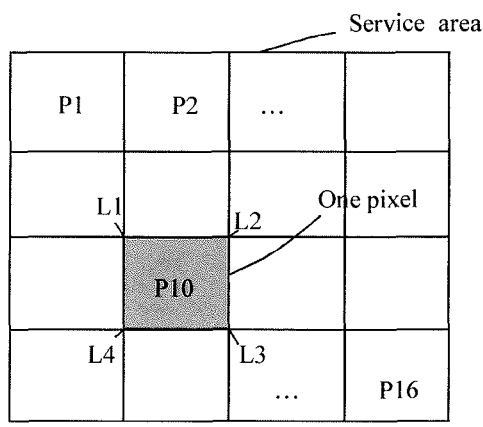
Figure 3A
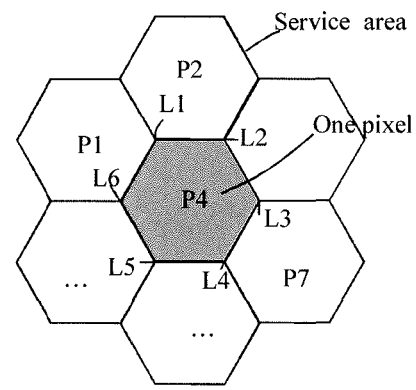
Figure 3B

METHOD AND APPARATUS FOR BROADCAST GEO-LOCATION DATABASE (GLDB) FOR TELEVISION WHITE SPACE (TVWS) SPECTRUM ACCESS

CROSS-REFERENCE TO RELATED APPLICATIONS

This patent application is a U.S. National Phase Application under 35 U.S.C. § 371 of International Application No. PCT/SG2016/050184, filed on 20 Apr. 2016, entitled METHOD AND APPARATUS FOR BROADCAST GEO-LOCATION DATABASE (GLDB) FOR TELEVISION WHITE SPACE (TVWS) SPECTRUM ACCESS, which claims the benefit of priority of Singapore patent application No. 10201503084S, filed 20 Apr. 2015.

FIELD OF INVENTION

The invention relates to geo-location database (GLDB) for TV white space (TVWS) spectrum access. More particularly, the invention relates to non-internet protocol broadcast communication between the GLDB and white space devices (WSDs).

BACKGROUND

In the past few decades, wireless communication grew exponentially along with various new services resulting in congestion of frequency spectrum. On the other hand, assigned spectrums based on old allocation in the past, such as TV bands, are being used inefficiently. As spectrum resource is limited, efficient reuse of underutilized frequency resources in assigned spectrums such as TVWS through new technologies has become important.

TV white space (TVWS) refers to the unused TV channels originally assigned to TV broadcasting. To improve the spectrum utilisation, several telecommunication regulators have opened TVWS for public use with license-exempt, and are actively promoting TVWS.

In TVWS applications, there is a need for a coordinating mechanism between primary users (including the operating TV channels and other licensed users) and WSDs to avoid interference to the primary users. This task can be undertaken by a geo-location database (GLDB). In particular, a WSD intending to access the TVWS spectrum needs to first access the GLDB to ascertain available channels based on its location. Thereafter, the WSD selects a free channel to transmit with allowed parameters such as emission power, out-of-band interference limits and so on.

The GLDB is an effective way to protect primary users, i.e. users of TV signals. However, existing GLDBs have the following shortcomings:

A pre-communication link between GLDB and the WSD is needed for the WSD to ascertain the available white space channels and the corresponding locations. Currently, this pre-communication link is provided by the Internet. In other words, a WSD (fixed or mode II device type) of a TVWS spectrum access must have internet access capability. This raises a contradiction. If a user has obtained internet access capability, why does the need the TVWS communications? This need for internet access reduces user's interest in the TVWS although other mode I WSDs could still access to TVWS via fixed or mode II WSDs without the need for Internet access.

With the interactive internet access link, there is a risk of GLDB hacking caused by illegal users.

With the need for WSDs to have internet access link to GLDB, there is a risk of WSDs being hacked through internet connection.

Current TVWS spectrum accesses are based on GLDB, which are opened to public. However, as aforementioned, one of the fundamental drawbacks of this current approach is the need for WSDs to have the capability to inquire the database through internet access. A contradiction arises because when a pair of WSDs has the ability to access internet, there is no need for TVWS for communications.

Besides the GLDB approach, spectrum sensing and beacon transmitter are two alternative approaches that have been considered.

Spectrum sensing requires a WSD determine the availability of TV white space by listening to the spectrum either individually or collaboratively. The spectrum sensing approach suffers from hidden terminal problem. This means that if the channel from the primary user transmitter to the WSD is in deep fade or too weak, the WSD may not be able to detect the primary user and accessing the channel will result in interference to the primary user.

Beacon transmitter requires broadcast of primary users' information through beacon signals. The beacon signals can include channel occupancy information, transmission power, locations, and coverage area of the primary transmitters. However, there has been no concrete teaching on how the beacon transmitter approach can be realised. Existing methods on beacon transmitter can be classified into three categories:

Category 1: Each licensed primary transmitter broadcasts the beacon signal that contains the transmitter's own information. In this case, since the beacon signal of each transmitter only carries its own information, no connection to GLDB is required. The ability of a WSD in accessing a channel is determined by whether the WSD can hear the beacon or not.

Category 2: United States Federal Communications Commission (FCC) has proposed using a beacon transmitter to broadcast the list of channels that can be used by any WSD within coverage area of the beacon transmitter. In this case, the beacon transmitter needs to be connected to a GLDB to obtain the list of available channels within its coverage area. Similar to Category 1, hear-ability is used to determine whether a WSD can access the channel or not.

Category 3: A beacon transmitter is used to broadcast all licensed primary transmitters' information comprising frequency band, location and coverage area of each licensed transmitter within its coverage area using dedicated channel. A WSD needs to use its own location information together with the received beacon information to determine whether to access a channel. In this case, the WSD may need to self-compute to ascertain whether the WSD is within the coverage region of certain licensed transmitter.

The beacon approach of Category 1 and 2 relies on the WSD's hear-ability instead of calculating the geo-locations of each WSD. As such, performance of beacon approach is not reliable. The beacon approach of Category 3 uses the geo-location information, but it needs dedicated beacon transmitter which occupies additional frequency resource.

In view of the above and other issues with current internet accessing GLDB and other approaches used in TVWS spectrum access, method, apparatus and system for operating and communicating GLDB data, which at least obviate the above issues, are highly desired.

SUMMARY

In a first aspect of the invention, a method for operating television white space (TVWS) geo-location database (GLDB) is provided. The method comprises: embedding a plurality of data signals in a plurality of radio frequency (RF) broadcast signals of at least one existing television or radio channel, wherein the data signals comprise at least one of TVWS GLDB data, time reference data and broadcast transmitter data which comprises at least one of transmitter location data and transmitter identification.

In an embodiment of the first aspect, the method further comprises encrypting the data signals and/or coding the data signals using a pseudo-noise code.

In an embodiment of the first aspect, the method further comprises: transmitting, over a RF network which is other than an internet protocol (IP) network, the RF broadcast signals together with the embedded data signals to a plurality of white space devices.

In an embodiment of the first aspect, the TVWS GLDB data include one of TVWS occupancy data and TVWS availability data.

In an embodiment of the first aspect, the data signals are embedded in a plurality of vertical blanking intervals of the RF broadcast signals of the at least one existing television or radio channel.

In an embodiment of the first aspect, the data signals are embedded in a plurality of other-use periods comprised in a plurality of future extension frames of a plurality of second-generation Terrestrial Digital Video Broadcast (DVB-T2) super frames of the at least one existing television or radio channel.

In an embodiment of the first aspect, the data signals are embedded in a plurality of digital radio signals of the at least one existing television or radio channel.

In a second aspect of the invention, a method for ascertaining, at a white space device (WSD), television white space (TVWS) geo-location database (GLDB) information is provided. The method comprises: receiving, over a radio frequency (RF) network which is other than an internet protocol (IP) network, a plurality of RF broadcast signals of at least one existing television or radio channel; extracting a plurality of data signals from the RF broadcast signals; extracting, from the data signals, at least one of TVWS GLDB data, time reference data and broadcast transmitter data which comprises at least one of transmitter location data and transmitter identification; ascertaining at least one available white space channel based on the at least one of TVWS GLDB data, time reference data and broadcast transmitter data; and selecting one of the at least one available white space channel for performing TVWS communication.

In an embodiment of the second aspect, the data signals are decrypted and/or decoded.

In an embodiment of the second aspect, the TVWS GLDB data include one of TVWS occupancy data and TVWS availability data.

In an embodiment of the second aspect, in an absence of ascertaining a location of the white space device and if the RF broadcast signals are received from a plurality of broadcast transmitters, selecting at least one available white space channel is based on at least one of the following: a signal-to-noise ratio of each of the broadcast transmitters, and a count of each of the at least one available white space channel.

In an embodiment of the second aspect, a location of the white space device is ascertained; and the at least one available white space channel is ascertained based at least on the TVWS GLDB data and the ascertained location.

In an embodiment of the second aspect, the location of the white space device is ascertained based at least on time reference data comprised in the data signals.

In an embodiment of the second aspect, the plurality of data signals are extracted from a plurality of vertical blanking intervals of the RF broadcast signals.

In an embodiment of the second aspect, the plurality of data signals are extracted from a plurality of other-use periods comprised in a plurality of future extension frames of a plurality of second-generation Terrestrial Digital Video Broadcast (DVB-T2) super frames which are comprised in the RF broadcast signals.

In an embodiment of the second aspect, the RF broadcast signals include digital radio signals.

In a third aspect of the invention, a system for operating television white space (TVWS) geo-location database (GLDB) is provided. The system comprises: an encoder unit configured to embed a plurality of data signals in a plurality of radio frequency (RF) broadcast signals of at least one existing television or radio channel, wherein the data signals comprise at least one of TVWS GLDB data, time reference data and broadcast transmitter data which comprises at least one of transmitter location data and transmitter identification.

In a fourth aspect of the invention, a white space device (WSD) for ascertaining television white space (TVWS) geo-location database (GLDB) information is provided. The device comprises: a receiver unit configured to receive, over a radio frequency (RF) network which is other than an internet protocol (IP) network, a plurality of RF broadcast signals of at least one existing television or radio channel; a first extraction unit configured to extract a plurality of data signals from the RF broadcast signals; a second extraction unit configured to extract, from the data signals, at least one of TVWS GLDB data, time reference data and broadcast transmitter data which comprises at least one of transmitter location data and transmitter identification; and a channel selection unit configured to: ascertain at least one available white space channel based on the at least one of TVWS GLDB data, time reference data and broadcast transmitter data; and select one of the at least one available white space channel for performing TVWS communication.

BRIEF DESCRIPTION OF DRAWINGS

FIG. 2 illustrates an example signal structure of an embedded broadcast GLDB;

FIGS. 3A and 3B illustrate examples of service area segmentation in pixel-based GLDB;

DETAILED DESCRIPTION OF THE INVENTION

Figure 1A:
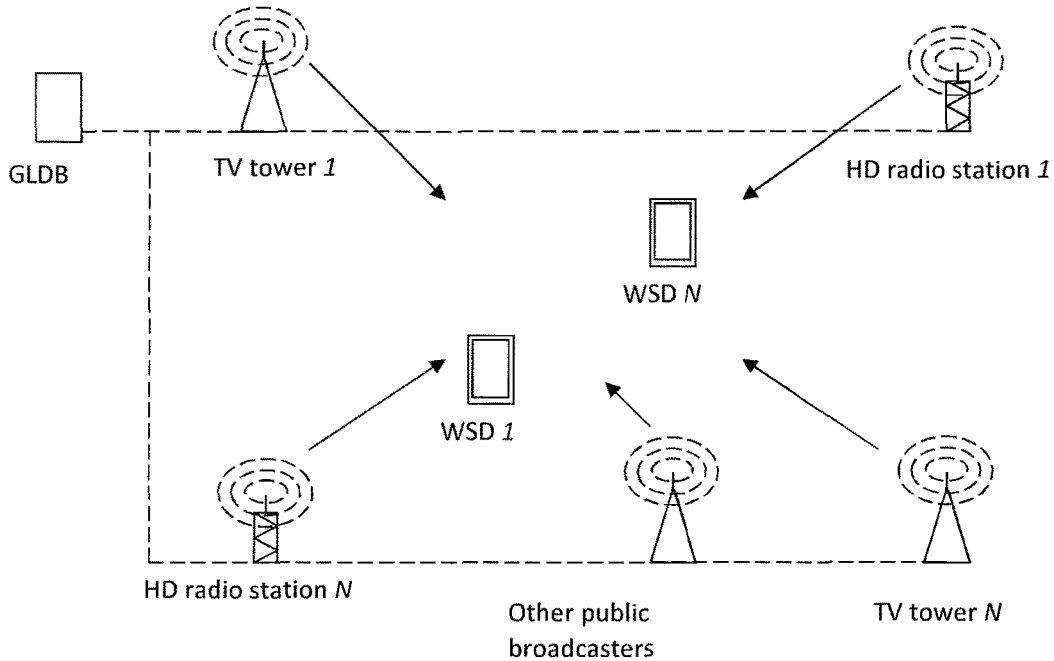
FIG. 1A is a schematic overview of implementing a broadcast GLDB for TVWS spectrum access in existing television and/or radio broadcast channels.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

In various embodiments, television white space (TVWS) geo-location database (GLDB) and/or other data are embedded into radio frequency (RF) broadcast signals of existing television or radio channels operated by one or more public broadcasters. The embedded TVWS GLDB and/or other data are transmitted together with RF broadcast signals, over a RF network which is other than an internet protocol (IP) network, to white space devices (WSDs) so that WSDs can obtain geo-location and other data without having to obtain internet connection as pre-communication link.

Figure 1B:
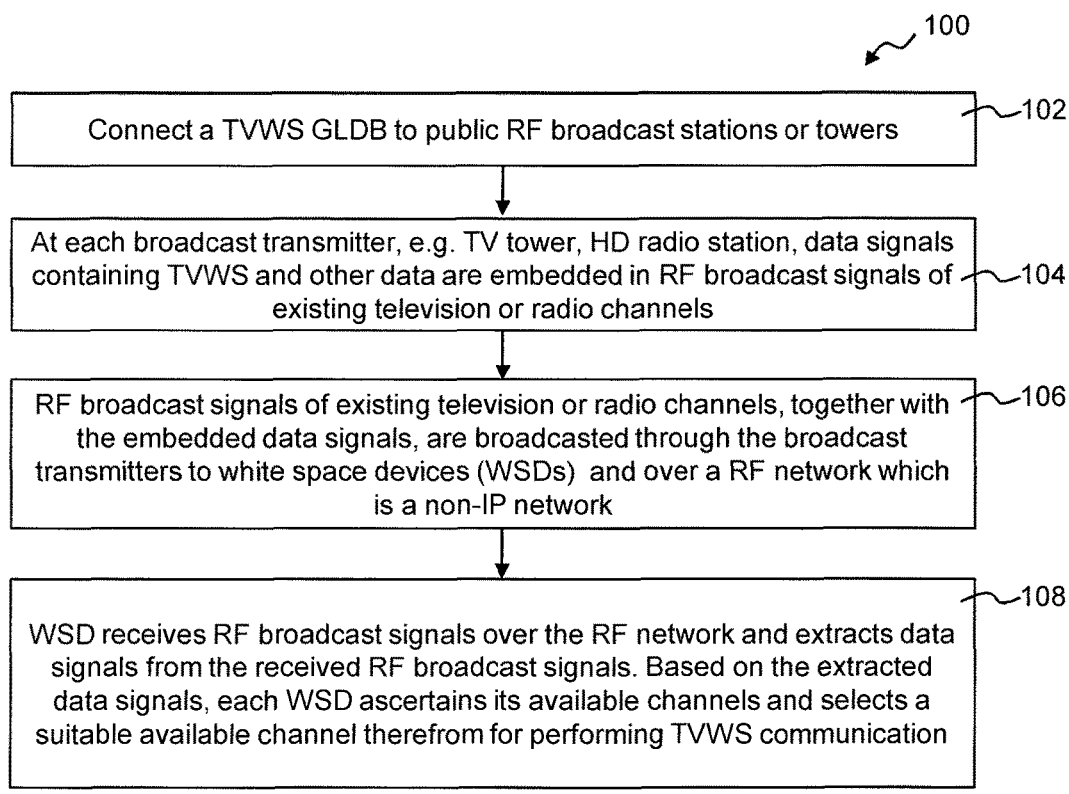
FIG. 1B is a flow chart illustrating a method of implementing a broadcast GLDB for TVWS spectrum access in existing broadcast channels.

Reference is made to FIG. 1A which is a schematic overview of implementing a broadcast GLDB for TVWS spectrum access in existing television and/or radio broadcast channels and FIG. 1B which is a flow chart 100 illustrating a method of implementing a broadcast GLDB for TVWS spectrum access in existing broadcast channels.

In block 102 of FIG. 1B, a TVWS GLDB is connected to multiple broadcast transmitters, e.g. TV tower or station, HD radio station, other public broadcasters (see FIG. 1A).

In block 104 of FIG. 1B, at each broadcast transmitter, data signals are embedded in RF broadcast signals of existing television or radio channels (see FIG. 1A). The data signals include at least one of TVWS GLDB data, broadcast transmitter data and time reference data, or a combination thereof. Regardless of the data selection or combination to be embedded, the selected data are collectively referred to as "TVWS GLDB and/or other data" in the present disclosure. Broadcast transmitter includes at least one of transmitter location and transmitter identification. TVWS GLDB data include data on available white space channels (hereinafter "available channel") and location areas of the available channels. This embedding procedure may involve coding of the data signals with a pseudo-noise (PN) code and encrypting of the data signals.

In block 106 of FIG. 1B, RF broadcast signals of existing television or radio channels, together with the embedded data signals containing TVWS GLDB and/or other data, are broadcasted through the broadcast transmitters to WSDs. This broadcast takes place over a RF network (see FIG. 1A) which is a non-IP network and does not require internet capability.

In block 108 of FIG. 1B, WSDs receive RF broadcast signals over the RF network. Each WSD extracts data signals from the received RF broadcast signals. This extraction procedure may involve decrypting and any decoding of the data signals to extract TVWS GLDB and other data. Based on the extracted TVWS GLDB and/or other data, each WSD ascertains its available channels and selects a suitable available channel therefrom for performing TVWS communication.

FIG. 2 illustrates an example structure and contents of an embedded data signal to be broadcasted. The data signal contents include:

(i) Transmitter data, e.g. transmitter identification (ID) and/or transmitter location data.

The transmitter refers to the broadcast transmitter, e.g. TV tower, radio station, which is to transmit the RF broadcast signals with the embedded data signals.

(ii) TVWS GLDB data, where GLDB data have any of three possible formats:

(a) Pixel based

In particular, a whole area serviced by the GLDB is divided into a number of pixel areas, and the GLDB provides the information on the location of each pixel area and the available channels with power limitations in each pixel area. FIGS. 3A and 3B illustrate service area segmentation in the pixel based GLDB. The pixel area can take any shape. Two examples of pixel shapes are shown in FIGS. 3A and 3B. The location of each pixel is determined by its corner locations, which are L1 to L4 for the square pixel P10 in the given example of FIG. 3A, or L1 to L6 for cellular pixel P4 in the given example of FIG. 3B. The corner points can be given directly or ascertained through central location of the pixel, radius of the pixel area and the pose information, i.e. angle from the North direction or pole.

(b) Contour based.

In particular, the GLDB consists of primary users' protection contours in the service area. WSD will rely on this protection contour information to determine available channels.

(c) Transmitter parameter based.

In particular, the GLDB consists of the primary users' emission powers, locations, antenna heights above average terrain and radiation pattern and so on in the service area. WSD will rely on this transmitter parameter information to calculate the contours of the primary users and then ascertain a suitable available channel.

(iii) Time reference data

Time reference data allows a WSD perform self-positioning even in the absence of additional positioning device such as Global Positioning System (GPS). The positioning principle is similar to GPS in which time reference data are transmitted from satellites. To reduce RF broadcast load, a country-wide GLDB is separated to N service areas, where N≥1. A GLDB broadcaster transmits only the GLDB data for the local service area, e.g. a city or areas near the broadcaster.

While data signals can include all of the aforementioned data contents, it is to be appreciated that the data signals may include one or a combination of the aforementioned data contents. In one example, only broadcast transmitter data, e.g. transmitter identification and/or transmitter location data, are comprised in the data signals to be broadcasted. In this example, transmission resources required are low, however, the WSD would have to derive available channels after receipt of the data signals. In another example, GLDB data, e.g. pixel-based GLDB data, are comprised in the data signals to be broadcasted. In yet another example, transmitter data, GLDB data and time reference data are comprised in the data signals to be broadcasted.

If the data signals are transmitted over multiple broadcasters in the same frequency, the data signals are coded using different pseudo noise (PN) codes to distinguish between signals from different broadcast transmitters. If each broadcast transmitter uses different frequency, code division is not needed and, accordingly, the PN code length can be 1.

In certain embodiments, the above data signals are encrypted to protect from unauthorized or illegal use.

Various example implementations of the invention are provided in the following paragraphs.

Teletext Based Broadcast GLDB

Since teletext function is in wide existence in TV broadcasting, the broadcast GLDB according to the invention can be developed upon the teletext function without requiring additional hardware at the broadcast transmitter.

Figure 4:
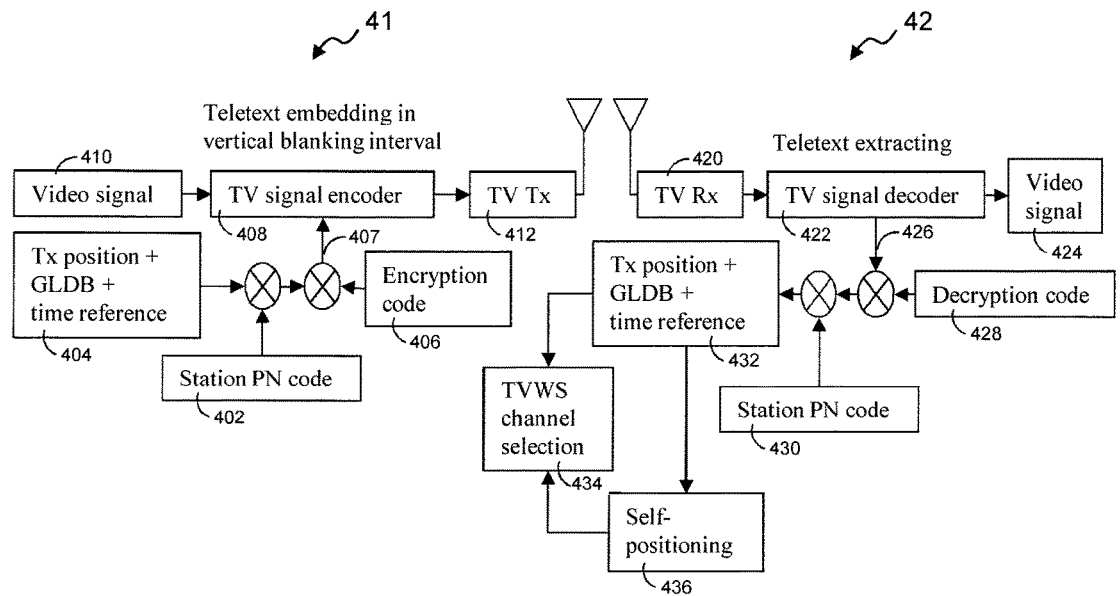
FIG. 4 is a block diagram illustrating signal embedding at broadcast transmitter and signal extraction at a WSD according to one embodiment for teletext based broadcast GLDB.

Reference is made to FIG. 4 which shows a block diagram illustrating signal embedding at broadcast transmitter and signal extraction at a WSD.

At a TV tower 41, a station PN code unit codes TVWS GLDB and/or other data 404 using the TV tower's PN code 402. An encryption unit encrypts the coded data using an encryption code 406. A TV signal encoder unit 408 receives and embeds the coded and encrypted data signals 407 in the vertical blanking intervals (VBI) of TV RF broadcast signals, e.g. video signals 410, in a similar method as teletext signals. The TV RF broadcast signals, together with the embedded data signals 407, are sent to a broadcast transmitter 412, e.g. TV transmitter, of the TV tower. The broadcast transmitter 412 broadcasts the signals over a RF network. The process involving coding (optional), encryption and embedding is performed at every TV tower connected to the GLDB.

If TV channels from different TV towers have different frequencies, the PN code is 1. This means the PN codes for distinguishing between different TV channels are not required.

At a WSD 42, a TV receiver unit 420 receives the TV RF broadcast signals which include embedded data signals 407. A TV signal decoder unit 422 extracts video signals 424 and data signals 426 from the RF broadcast signals. The TV signal decoder 422 is needed at the WSD 42 because teletext signals can only be extracted after the frame synchronization of the TV signal is recovered. The data signals 426 are decrypted by a decryption unit using a decryption code 428, and decoded at a station PN code unit using a station PN code 430 to extract TVWS GLDB and/or other data 432. In certain embodiments, the TV signal decoder unit 422 may be referred to as first extraction unit; the decryption unit 428 and station PN code unit 430 may be collectively referred to as second extraction unit.

If a WSD 42 is provided with self-positioning unit 436, the WSD 42 can ascertain from TVWS GLDB and/or other data 432 the available channels based on its ascertained location and select a suitable available channel for performing TVWS communication. For example, a WSD can perform self-positioning by using time reference signal from multiple (e.g. three) TV channels from different TV towers. This self-positioning uses the same hardware as teletext reception, but needs additional signal processing similar to GPS. In another example, a WSD with dedicated self-positioning unit would not require transmitter location data and time reference data in order to perform self-positioning, but would require TVWS GLDB data to ascertain available channels.

Based on TVWS GLDB and/or other data 432 and the WSD location ascertained from self-positioning, a TVWS channel selection unit 434 ascertains available channels for the WSD 42 and selects a suitable available channel for performing TVWS communication.

If the WSD is not provided with self-positioning capability, position or location data of the WSD can be roughly known or estimated by its hear-ability. One can select the available channel for TVWS communication. However, it remains unclear if a WSD receives signals simultaneously from multiple broadcast towers. It is possible for a WSD to receive available channels from multiple broadcast signals either from multiple broadcast towers or from same broadcast tower but different frequencies.

For a WSD which does not perform self-positioning, methods for selecting available channels are described with reference to FIG. 5.

Figure 5:
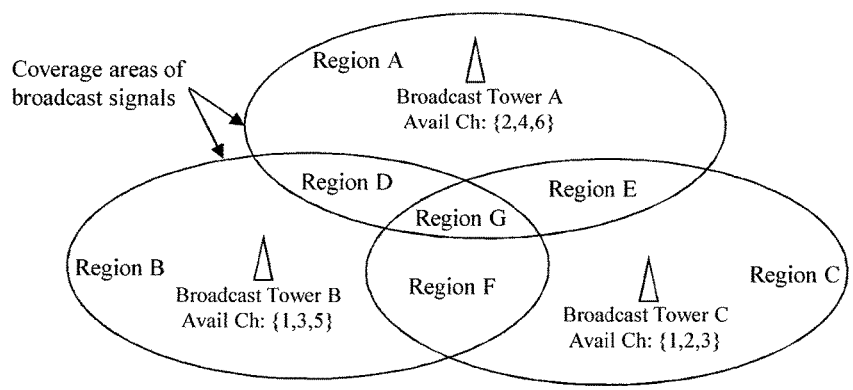
FIG. 5 is a schematic overview illustrating overlapping signal coverage from multiple broadcast transmitters or towers.

FIG. 5 shows an example of three broadcast towers or transmitters which have overlapping coverage. Therefore, WSDs in Regions D, E, F and G, will receive data on available channels from at least two broadcast towers. The WSDs can choose any available channel decoded from any broadcast tower. For example, a WSD in Region E of FIG. 5 is able to decode that the available channels are {2,4,6} from tower A and {1,2,3} from tower C. A preference on choice of available channels and/or transmitting broadcast tower can be determined using any of the following methods.

In one method of determining preference of available channels, the preference is determined by signal-to-noise ratio (SNR). Using the given example illustrated in FIG. 5, if the signal-to-noise ratio (SNR) of broadcast signals from tower A is higher than tower C, the WSD may choose available channels {2,4,6} over {1,3}. This is because when the SNR of the broadcast signal is higher, it means that the WSD is more likely to be closer to the broadcast tower and within its coverage. This reduces the likelihood of a WSD selecting available channels from a more distant broadcast tower even when the WSD is actually outside its coverage but manages to decode the broadcast signals.

In another method of determining preference of available channels, the preference is determined by the number of times an available channel is decoded by the WSD from different broadcast signals, i.e. a count of available channels. Using the given example illustrated in FIG. 5, channel 2 is being broadcasted by both towers A and C and therefore should be given priority over the rest of the channels.

In yet another method of determining preference of available channels, the preference is determined by a combination of the above two methods. Using the given example illustrated in FIG. 5, based on a combination of the highest SNR and the highest number of times broadcasted for an available channel, preferred available channels in the given example become {2}, {4,6} and {1,3} with {2} being the highest priority and {1,3} the being the lowest priority.

Figure 6A:
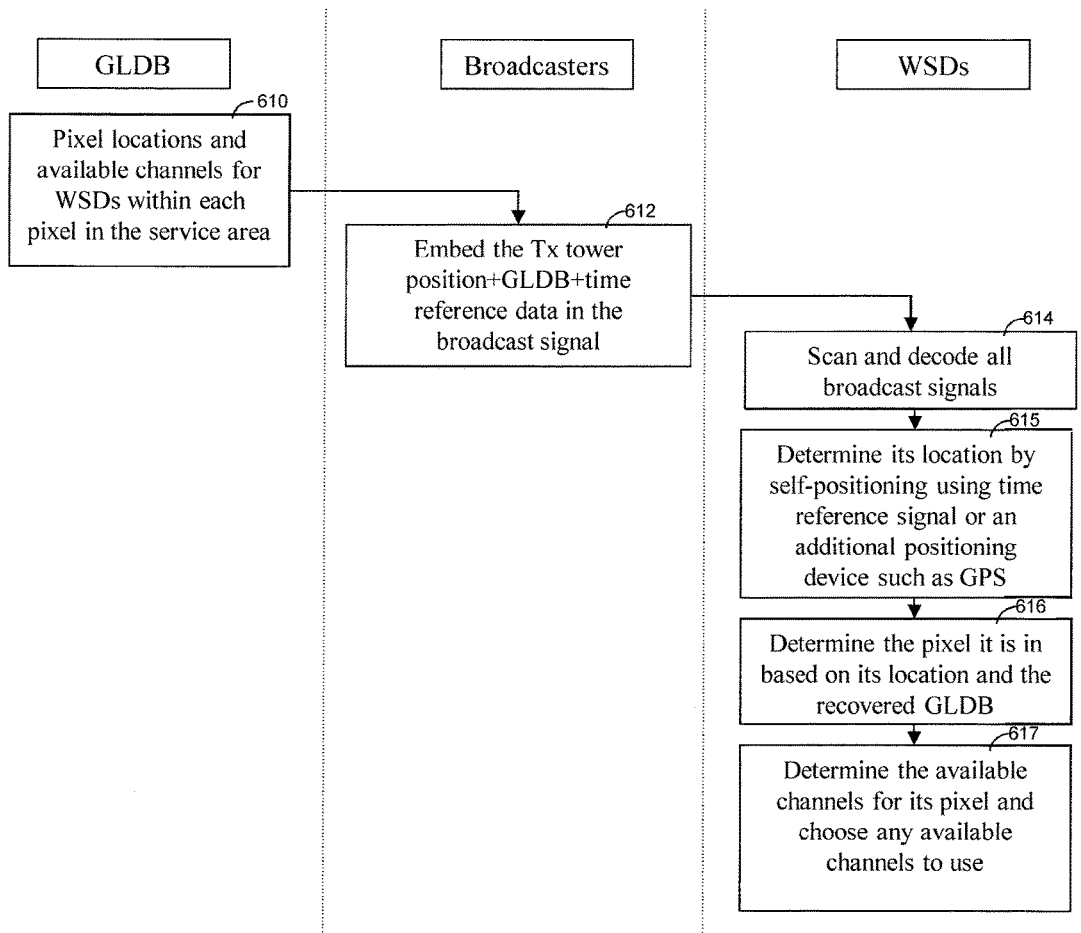
FIG. 6A is a flow chart illustrating a method of ascertaining available white space channels from broadcast signals based on pixel-based GLDB.
Figure 6B:
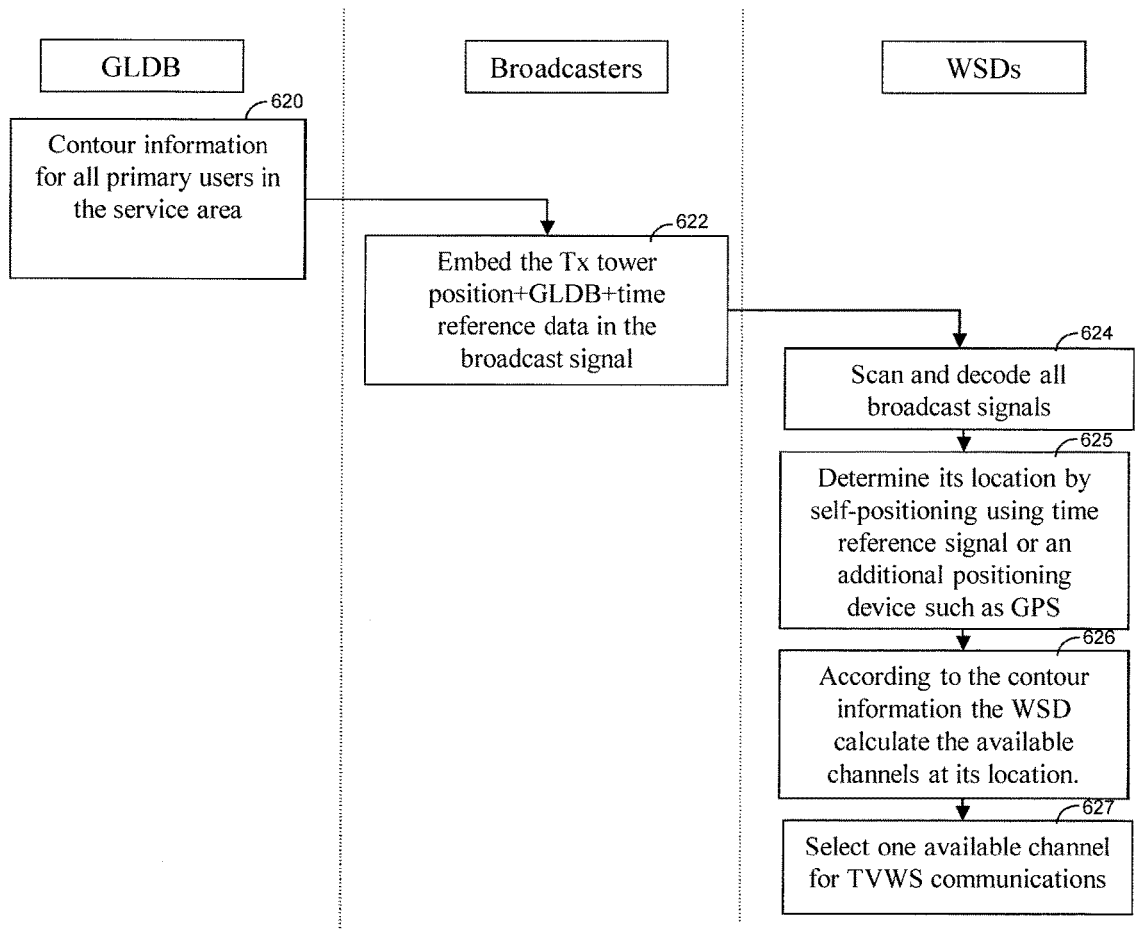
FIG. 6B is a flow chart illustrating a method of ascertaining available white space channels from broadcast signals based on contour-based GLDB.
Figure 6C:
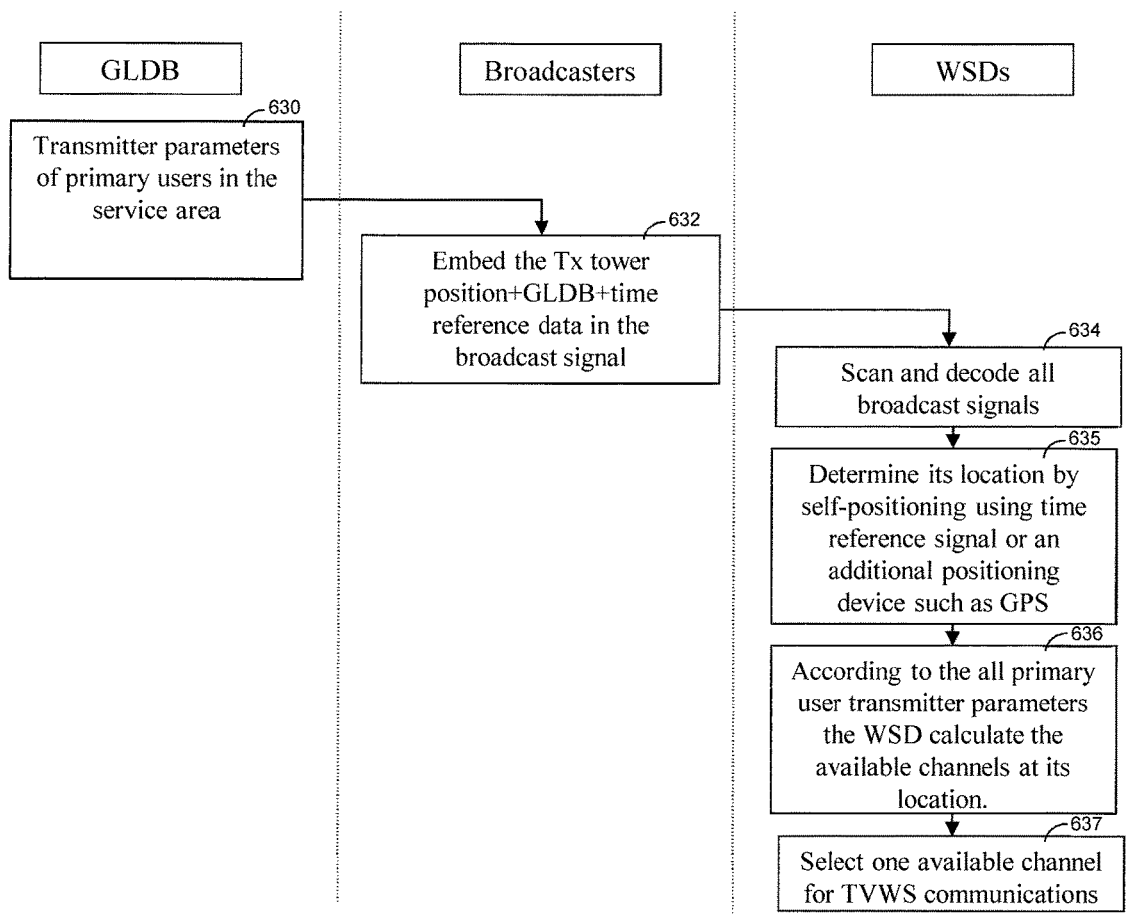
FIG. 6C is a flow chart illustrating a method of ascertaining available white space channels from broadcast signals based on parameter-based GLDB.

For a WSD which has performed self-positioning, methods for ascertaining and selecting available channels are illustrated in FIGS. 6A to 6C.

Reference is made to FIG. 6A. At pixel-based GLDB, pixel locations and available channels for WSDs within each pixel in the service area are mapped (block 610). At a broadcast transmitter, e.g. broadcaster, data signals comprising at least one of TVWS GLDB data, transmitter location data and time reference data are embedded in RF broadcast signals (block 612). At a WSD, RF broadcast signals are received, and data signals are extracted therefrom and decoded (block 614). Based on time reference data extracted from the decoded data signals or additional positioning device, such as GPS, the WSD ascertains its location. Based on the ascertained location and extracted TVWS GLDB data, the WSD ascertains the pixel location in which the WSD is located (block 615). Based on the ascertained pixel location, available channels are ascertained (block 616) and the WSD selects a suitable available channel for performing TVWS communication (block 617).

Reference is made to FIG. 6B. At contour-based GLDB, contour information for all primary users in the service area is mapped (block 620). At a broadcast transmitter, e.g. broadcaster, data signals comprising at least one of TVWS GLDB data, transmitter location data and time reference data are embedded in RF broadcast signals (block 622). At a WSD, RF broadcast signals are received, and data signals are extracted therefrom and decoded (block 624). Based on time reference data extracted from the decoded data signals or additional positioning device, such as GPS, the WSD ascertains its location (block 625). Based on the ascertained location and TVWS GLDB data, i.e. contour information, WSD ascertains available channels (block 626) and selects a suitable available channel for performing TVWS communication (block 627).

Reference is made to FIG. 6C. At transmitter-based GLDB, transmitter parameters information for all primary users in the service area is mapped (block 630). At a broadcast transmitter, e.g. broadcaster, data signals comprising at least one of TVWS GLDB data, transmitter location data and time reference data are embedded in RF broadcast signals (block 632). At a WSD, RF broadcast signals are received, and data signals are extracted therefrom and decoded (block 634). Based on time reference data extracted from the decoded data signals or additional positioning device, such as GPS, the WSD ascertains its location (block 635). Based on the ascertained location and TVWS GLDB data, i.e. all primary user transmitter parameters, WSD ascertains available channels (block 636) and selects a suitable available channel for performing TVWS communication (block 637).

Second-Generation Terrestrial Digital Video RF Broadcast (DVB-T2) Based Broadcast GLDB This is based on the single frequency network (SFN) digital TV system such as DVB-T2 system. In a SFN, a WSD can receive RF broadcast signals of a TV channel from multiple TV towers.

Figure 7:
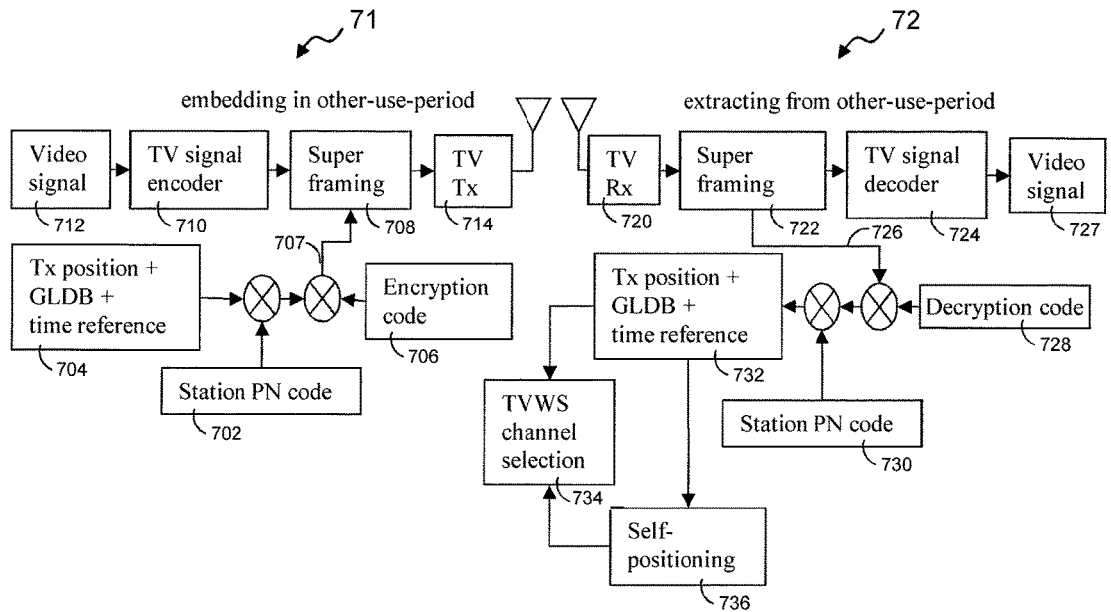
FIG. 7 is a block diagram illustrating signal embedding at broadcast transmitter and signal extracting at a WSD according to one embodiment for DVB-T2 based broadcast GLDB.
Figure 8:
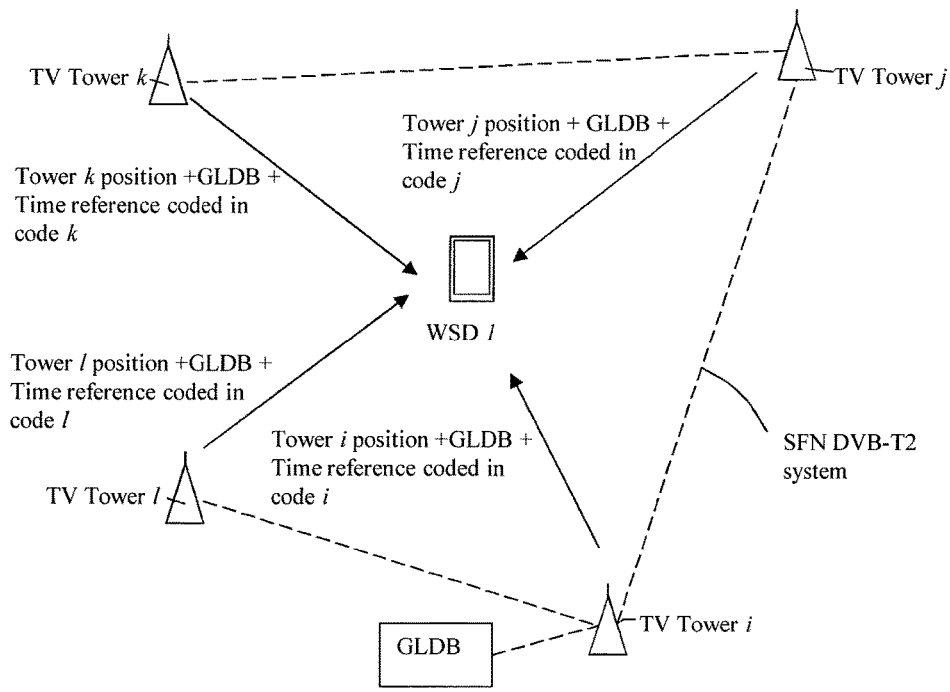
FIG. 8 is a schematic overview of implementing GLDB for TVWS spectrum access using SFN DVB-T2.

FIG. 7 is a block diagram illustrating signal embedding at broadcast transmitter and signal extracting at a WSD according to one embodiment for DVB-T2 based broadcast GLDB. FIG. 8 is a schematic overview of implementing GLDB for TVWS spectrum access using SFN DVB-T2.

At a TV tower 71, a station PN code unit codes TVWS GLDB and/or other data 704 using with the TV tower's PN code 702. An encryption unit encrypts the coded data using an encryption code 706. A super framing unit 708 receives and embeds the coded and encrypted data signals 707 in the other-use-period of the future extension frame (FEF) of the super frame, i.e. TV RF broadcast signals output from the TV signal encoder unit 710 which encodes a video signal 712. The TV RF broadcast signals, together with the embedded data signals 707, are sent to multiple broadcast transmitters 714, e.g. TV transmitters, for simultaneous broadcast therefrom over a RF network.

At a WSD 72, a TV receiver unit 720 receives the RF broadcast signals which include embedded data signals 707. A super framing unit 722 extracts TV signals and data signals 726 from the RF broadcast signals. A TV signal decoder unit 724 decodes the extracted TV signals to extract video signals 727. The data signals 726 are decrypted by a decryption unit using a decryption code 728, and decoded by a station PN code unit using a station PN code 730 to extract TVWS GLDB and/or other data 732. Dedicated pseudo-noise (PN) code for each broadcast transmitter, e.g. TV tower, is assigned and known to the WSD 72. The WSD 72 can decode the GLDB and time reference data from different TV towers by using the respective PN codes. In certain embodiments, the super framing unit 722 may be referred to as first extraction unit; the station PN code unit may be referred to as second extraction unit.

If the WSD 72 is provided with self-positioning unit 736, the location of the WSD 72 is ascertained by using time reference data from different broadcast towers or transmitters. This self-positioning is suitable for both indoor and outdoor environments. Having received TVWS GLDB and/or other data and performed self-positioning, the WSD can 72 ascertain available channels based on the ascertained location and select a suitable available channel for performing TVWS communication, as described in relation to FIGS. 6A to 6C.

Based on TVWS GLDB and/or other data 732 and, if any, the WSD location ascertained from self-positioning, a TVWS channel selection unit 732 ascertains available channels for the WSD 72 and selects a suitable available channel for performing TVWS communication.

If the WSD 72 does not perform self-positioning based on time reference data, the WSD 72 may be provided with an additional GPS device for positioning in outdoor environment.

In the case that the WSD 72 has no self-positioning capability, the WSD 72 can adopt the same method without self-positioning as described above in relation to teletext based broadcast GLDB and FIG. 5.

For DVB-T2 system applications, the WSD 72 does not need to recover the RF broadcast signals e.g. TV signals but only decodes the other-use-period in FEF.

HD Radio Based Broadcast GLDB

GLDB and time reference data can also be transmitted through HD radio stations in FM (Frequency Modulation) or AM (Amplitude Modulation), which are in different locations and operating at different frequencies.

Figure 9:
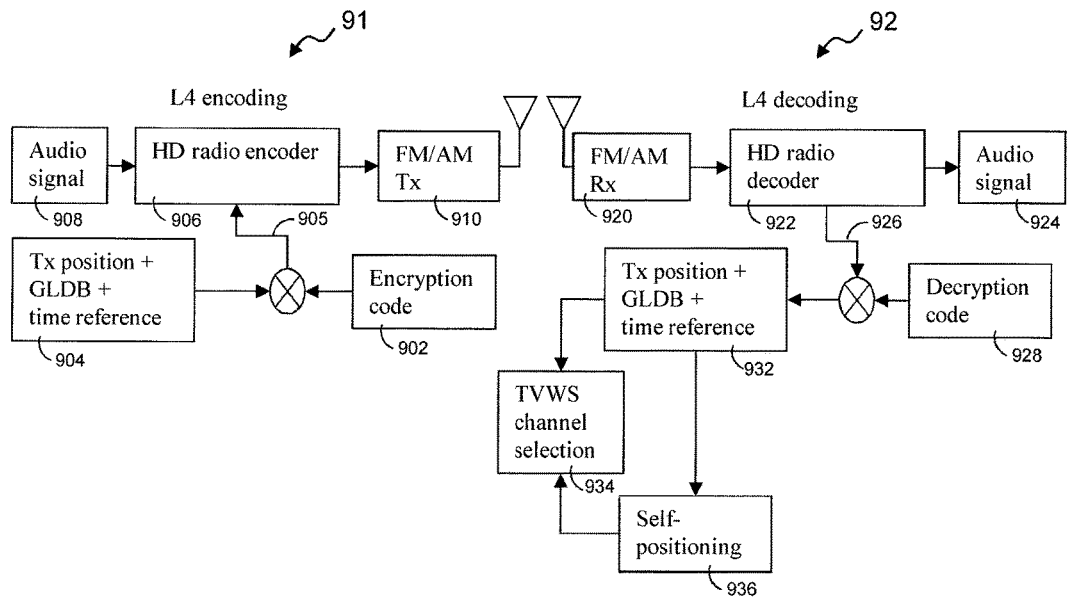
FIG. 9 is a block diagram illustrating signal embedding at broadcast transmitter and signal extracting at a WSD according to one embodiment for HD radio based broadcast GLDB.
Figure 10:
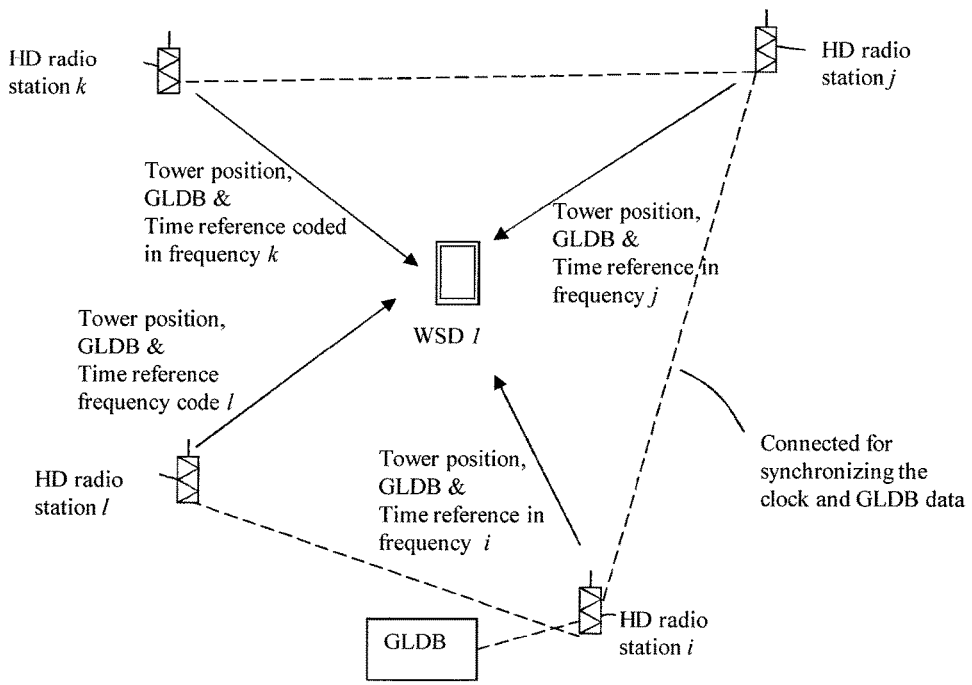
FIG. 10 is a schematic overview of implementing GLDB for TVWS spectrum access using HD radio broadcast.

FIG. 9 is a block diagram illustrating signal embedding at broadcast transmitter and signal extracting at a WSD according to one embodiment for HD radio based broadcast GLDB. FIG. 10 is a schematic overview of implementing GLDB for TVWS spectrum access using HD radio broadcast.

At a radio tower or station 91, an encryption unit encrypts TVWS GLDB and/or other data 904 using an encryption code 902. A HD radio encoder unit 906 embeds the encrypted data signals 905 in radio RF broadcast signals, e.g. audio signals 908. A FM/AM broadcast transmitter 910 broadcasts the radio RF broadcast signals together with the embedded data signals 905 over a RF network.

At a WSD 92, FM/AM receiver units 920 for each radio frequency and/or modulation are provided. The receiver units 920 receive RF broadcast signals from one of the 5 FM/AM broadcast transmitter, e.g. radio station. A radio decoder unit 922 decodes the received RF broadcast signals to extract an audio signal 924 and a data signal 926 which is decrypted by a decryption unit using a decryption code 926 to extract TVWS GLDB and/or other data 932 (or 904). In certain embodiments, the HD radio decoder 922 may be referred to as first extraction unit; the decryption unit may be referred to as second extraction unit.

If the WSD 92 is provided with a self-positioning unit 936, the self-positioning unit 936 ascertains a location of the WSD 92 based on time reference data received from multiple stations (e.g. more than 3) from different locations. If the WSD 92 has an additional positioning unit such as GPS unit for positioning in the outdoor environment, the GPS unit ascertains a location of the WSD 92.

Based on TVWS GLDB and/or other data 932 and the WSD location ascertained from self-positioning, a TVWS channel selection unit 934 ascertains available channels for the WSD 92 and selects a suitable available channel for performing TVWS communication.

If the WSD has no self-positioning capability, it can adopt the same method without self-positioning as described in relation to teletext based broadcast GLDB and FIG. 5.

As HD radios usually have different carrier frequencies, PN-code in FIG. 2 is content 1 and hence is ignored in FIG. 9. However, HD radio system could also be operated in the same frequency such as SFN HD radio system. In this case, the direct spread spectrum with different PN codes is used to separate and identify signals from different stations. The coding method is the same as that in DVB-T2 based broadcast GLDB. The same method applies to other broadcast systems.

WSD Quality Control in Broadcast TVWS Spectrum Access

Since broadcasting is one-way signal transmission from GLDB to WSDs, the GLDB cannot obtain WSD's information during every spectrum access application, however it is imperative to control WSD's quality. This quality control can be performed when the WSD registers with the GLDB as a member. The WSD's quality or performance parameters such as transmitter's maximum emission power, out-of-band interference class, receiver's signal-to-interference ratio level and so on must be submitted with its membership application. The TVWS spectrum access will approve the membership application based on the WSD's quality and limit of number of members of the system, i.e. if the WSD's performance parameters are within a predetermined range and if the number of members has not breached a predetermined limit. Only the approved WSD will be provided a decryption code for recovering the TVWS GLDB and/or other data from broadcasted signals. In practice, The above description and examples are illustrated on the assumption that available white space channels are being broadcasted. However, the invention is not restricted to broadcasting of available channels but is applicable with suitable modifications for broadcasting occupied channels. Accordingly, the TVWS GLDB data is either TVWS occupancy data or TVWS availability data.

Embodiments of the invention are advantageous at least as follows:

Internet connection is not needed as the pre-communication link to the GLDB, which makes the TVWS application more reasonable and practical.

No additional frequency resource is needed. Embedded data signals are transmitted simultaneously with the TV or radio RF broadcast signals In teletext, DVB-T2 or HD radio solutions, no additional frequency resource and transmitter-side hardware investment is needed. Only additional signal embedding and software signal processing are needed on transmitter side. The embedded signals do not interfere with or affect the TV or radio RF broadcast signals.

There is no risk of GLDB hacking caused by illegal users through internet access, and hence provides a more reliable approach.

There is no risk of customer data leakage resulting from hacking WSDs through internet access since there is no need for WSDs to connect to GLDB through internet.

The load of GLDB access becomes low, because there is no individual WSD access, thus resulting in huge cost savings in server investment.

The up-time of broadcast GLDB is likely to be higher due to better up-time of broadcast compared to internet access.

WSD can be provided with self-positioning capability in both indoor and outdoor environments without any additional positioning device, whereas the current WSD can only carry out positioning in outdoor environment with an additional GPS device.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

What is claimed is:

1. A method for operating a television white space (TVWS) geo-location database (GLDB), the method comprising:
    embedding a plurality of data signals in a plurality of radio frequency (RF) broadcast signals of at least one existing television or radio channel, wherein the data signals comprise at least one of TVWS GLDB data, time reference data and broadcast transmitter data which comprises at least one of transmitter location data and transmitter identification; and
    broadcasting the RF broadcast signals, together with the embedded data signals, over a RF network which is other than an internet protocol (IP) network,
        wherein broadcasting the RF broadcast signals includes transmitting, over the RF network, the RF broadcast signals, together with the embedded data signals, to a plurality of white space devices without a pre-communication link between the TVWS GLDB and any one of the plurality of white space devices.

2. The method according to claim 1, further comprising: before embedding a plurality of data signals in a plurality of RF broadcast signals of at least one existing television or radio channel,
    encrypting the data signals.

3. The method according to claim 2, further comprising: before encrypting the data signals,
    coding the data signals using a pseudo-noise code.

4. The method according to claim 1, wherein the TVWS GLDB data include one of TVWS occupancy data and TVWS availability data.

5. The method according to claim 1, wherein embedding a plurality of data signals in a plurality of RF broadcast signals of at least one existing television or radio channel further comprises:
embedding the data signals in a plurality of vertical blanking intervals of the RF broadcast signals of the at least one existing television or radio channel.

6. The method according to claim 1, wherein embedding a plurality of data signals in a plurality of RF broadcast signals of at least one existing television or radio channel further comprises:
embedding the data signals in a plurality of other-use periods comprised in a plurality of future extension frames of a plurality of second-generation Terrestrial Digital Video Broadcast (DVB-T2) super frames of the at least one existing television or radio channel.

7. The method according to claim 1, wherein embedding a plurality of data signals in a plurality of RF broadcast signals of at least one existing television or radio channel further comprises:
embedding the data signals in a plurality of digital radio signals of the at least one existing television or radio channel.

8. A system for operating a television white space (TVWS) geo-location database (GLDB), the system comprising:
an encoder unit configured to embed a plurality of data signals in a plurality of radio frequency (RF) broadcast signals of at least one existing television or radio channel, wherein the data signals comprise at least one of TVWS GLDB data, time reference data and broadcast transmitter data which comprises at least one of transmitter location data and transmitter identification; and
a broadcast transmitter configured to broadcast, over a RF network which is other than an internet protocol (IP) network, the RF broadcast signals together with the embedded data signals and further configured to transmit, over the RF network, the RF broadcast signals together with the embedded data signals to a plurality of white space devices without a pre-communication link between the TVWS GLDB and any one of the plurality of white space devices.

9. The system according to claim 8, further comprising:
an encryption unit configured to encrypt the data signals.

10. The system according to claim 9, further comprising:
a pseudo-noise (PN) code unit configured to code the data signals using a pseudo-noise code.

11. The system according to claim 8, wherein the TVWS GLDB data include one of TVWS occupancy data and TVWS availability data.

12. The system according to claim 8, wherein the encoder unit is further configured to:
embed the data signals in a plurality of vertical blanking intervals of the broadcast signals of the at least one existing television or radio channel.

13. The system according to claim 8, wherein the encoder is further configured to:
embed the data signals in a plurality of other-use periods comprised in a plurality of future extension frames of a plurality of second-generation Terrestrial Digital Video Broadcast (DVB-T2) super frames of the at least one existing television or radio channel.

14. The system according to claim 8, wherein the encoder is further configured to:
embed the data signals in a plurality of digital radio signals of the at least one existing television or radio channel.

15. A white space device (WSD) for ascertaining television white space (TVWS) geo-location database (GLDB) information, the device comprising:
a receiver unit configured to receive, over a radio frequency (RF) network which is other than an internet protocol (IP) network, a plurality of RF broadcast signals of at least one existing television or radio channel without having to obtain a pre-communication link between a GLDB having the TVWS GLDB information and the white space device;
a first extraction unit configured to extract a plurality of data signals from the RF broadcast signals;
a second extraction unit configured to extract, from the data signals, at least one of TVWS GLDB data, time reference data and broadcast transmitter data which comprises at least one of transmitter location data and transmitter identification; and
a channel selection unit configured to:
ascertain at least one available white space channel based on the at least one of TVWS GLDB data, time reference data and broadcast transmitter data; and
select one of the at least one available white space channel for performing TVWS communication.

16. The device according to claim 15, wherein the second extraction unit is further configured to: decrypt the data signals, and decode the data signals using a pseudo-noise code.

17. The device according to claim 15, wherein the channel selection unit is further configured to:
in an absence of ascertaining a location of the white space device and if the RF broadcast signals are received from a plurality of broadcast transmitters, select at least one available white space channel on at least one of the following:
a signal-to-noise ratio of each of the broadcast transmitters, and
a count of each of the at least one available white space channel.

18. The device according to claim 15, further comprising:
a self-positioning unit configured to: ascertain a position of the white space device, and ascertain the location of the white space device based on time reference data comprised in the data signals; and
a decoder configured to perform frame synchronization of the broadcast signals,
wherein the channel selection unit is further configured to:
ascertain the at least one available white space channel based on the at least one of TVWS GLDB data, time reference data and broadcast transmitter data;
wherein the first extraction unit is further configured to:
extract the plurality of data signals from a plurality of vertical blanking intervals of the RF broadcast signals, and
extract the plurality of data signals from a plurality of other-use periods comprised in a plurality of future extension frames of a plurality of second-generation Terrestrial Digital Video Broadcast (DVB-T2) super frames which are comprised in the RF broadcast signals.

* * * * *